United States Patent [19]

Takahashi

[11] Patent Number: 4,962,401

[45] Date of Patent: Oct. 9, 1990

[54] FILM CARTRIDGE

[75] Inventor: Koichi Takahashi, Minami-ashigara, Japan

[73] Assignee: Fuji Photo Film Co., Ltd., Minami-ashigara, Japan

[21] Appl. No.: 321,380

[22] Filed: Mar. 10, 1989

[30] Foreign Application Priority Data

Mar. 11, 1988 [JP] Japan .................................. 63-57785

[51] Int. Cl.⁵ .............................................. G03B 17/26
[52] U.S. Cl. .................................... 354/275; 242/71.1
[58] Field of Search .................... 354/275; 206/53, 54; 242/71, 71.1, 71.2

[56] References Cited

U.S. PATENT DOCUMENTS

| | | | |
|---|---|---|---|
| 4,221,479 | 9/1980 | Harvey | 354/275 |
| 4,335,948 | 6/1982 | Cocco | 354/275 |
| 4,407,579 | 10/1983 | Huff | 354/275 |

FOREIGN PATENT DOCUMENTS

| | | |
|---|---|---|
| 296230 | 7/1950 | Japan . |
| 37-32164 | 12/1962 | Japan . |
| 41-6297 | 3/1966 | Japan . |
| 43-3416 | 2/1968 | Japan . |
| 54-111822 | 9/1979 | Japan . |
| 55-21089 | 2/1980 | Japan . |

Primary Examiner—Brian W. Brown
Attorney, Agent, or Firm—Burns, Doane, Swecker & Mathis

[57] ABSTRACT

This invention relates to a photographic film cartridge including a cartridge case having a longitudinal axis and opposite end walls, a spool extending substantially co-axially with respect to the cartridge case and carried at the opposite end portions by the opposite end walls of the cartridge case for rotation about a longitudinal axis of the spool, the cartridge case including a flexible wall portion having an axially extending substantially straight edge portion, the cartridge case further including a rigid edge portion for cooperation with the straight edge portion, the flexible wall portion being deflectable between a closed position wherein the straight edge portion is engaged with the rigid edge portion to provide a substantially light-tight seal and an open position wherein the straight edge position is apart from the rigid edge portion to provide an axially extending film outlet slit opening between the edge portions. The photographic film cartridge is not required to be provided with light shielding materials and can be made compacter than conventional cartridges.

10 Claims, 3 Drawing Sheets

FILM CARTRIDGE

BACKGROUND OF THE INVENTION

The present invention relates to a film cartridge, and particularly to a film cartridge which is not required to be provided with light shielding materials and can be made compact.

PRIOR ART STATEMENT

Conventionally, film for still photography has been sold as wound into a roll on a spool housed in a cartridge. The cartridge containing the roll of film is provided with a film outlet. The film is pulled out from the film outlet by a predetermined length when a photograph is to be taken. The conventional film cartridge is shown in FIG. 9. As shown, the film cartridge 11 comprises a spool 12 made of plastic, a film 13 wound on the spool 12, and a cartridge case 14 made of metal encasing the film 13. The cartridge case 14 is provided with a film outlet 15 for permitting the film 13 to be pulled out from the case 14 for exposure. The film outlet 15 is formed in the shape of a slit and is provided with a light shielding material 16 such as felt on both of its inner surfaces so as to prevent exposure of the film 13 in the cartridge case 14. The interior of the cartridge 11 is thus shielded from external light.

However, even if shielding material 16 is provided on both of the inner surfaces of the film outlet 15, it is sometimes impossible to prevent external light from entering the cartridge 11. In this case, the film 13 is in danger of being exposed before any photographs are taken or after the entire roll of film has been used up. When a photograph is to be taken, the film 13 is pulled out from the film outlet 15 by a determined length for exposure. If the resistance arising when the film 13 passes through the shielding material 16 is not uniform, the film 13 may suffer abrasion. However, it is difficult to provide the film cartridge with the shielding material 16 on both of the inner surfaces of the film outlet 15 in such manner that the resistance will be uniform. For this reason it is difficult to increase the efficiency of producing the cartridges. Futhermore, a leader extends out from the film outlet 15 of the cartridge 11 by a certain length and when the cartridge is loaded into a camera this has to be engaged with the mechanism of the camera for feeding the film. The cartridge is thus troublesome to load and improper loading frequently occurs. In addition, the leader is sometimes pulled out from the film outlet 15 more than needed so that a portion of the unexposed film is brought outside of the cartridge 11 and exposed.

OBJECT AND SUMMARY OF THE INVENTION

It is therefore the object of the present invention to provide a film cartridge capable of maintaining the interior thereof reliably shielded from external light, without need to provide shielding material on the opposing inner surfaces of a film outlet.

According to the present invention, the above object can be accomplished by a photographic film cartridge comprising: a cartridge case having a longitudinal axis and opposite end walls; a spool extending substantially coaxially with respect to said cartridge case and carried at the opposite end portions by said opposite end walls of said cartridge case for rotation about a longitudinal axis of the spool, said cartridge case including a flexible wall portion having an axially extending substantially straight edge portion, said cartridge case further including a rigid edge portion for cooperation with said straight edge portion, said flexible wall portion being deflectable between a closed position wherein said straight edge portion is engaged with said rigid edge portion to provide a substantially light-tight seal and an open position wherein said straight edge position is apart from said rigid edge portion to provide an axially extending film outlet slit opening between said edge portions.

According to the present invention, the above object can be accomplished also by a photographic film cartridge comprising: a cartridge case having a longitudinal axis and opposite end walls; a spool extending substantially coaxially with respect to said cartridge case and carried at the opposite end portions by said opposite end walls of said cartridge case for rotation about a longitudinal axis of the spool, said cartridge case having means for providing a longitudinally extending closable film outlet slit opening.

In a preferred embodiment of the present invention, a photographic film cartridge is provided with means for interposing a tip end of said film between said straight edge portion and said rigid edge portion when said flexible wall portion is at a close position.

In another preferred embodiment of the present invention, a photographic film cartridge is provided with means for locking said flexible wall portion with said cartridge case when said flexible wall portion is at a close position.

The above object and advantageous features of the present invention will become apparent from the following description made with reference to the attached drawings.

DETAILED DESCRIPTION OF PREFERRED EMBODIMENTS

Figure 1:
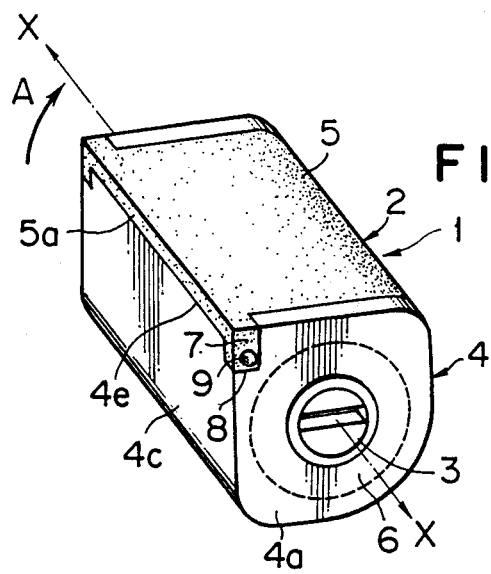
FIG. 1 is a perspective view showing a film cartridge which is an embodiment of the present invention.
Figure 2:
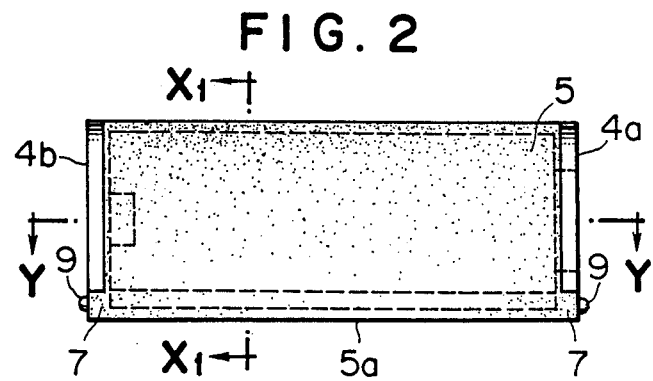
FIG. 2 is a plan view of the film cartridge shown in FIG. 1.
Figure 3:
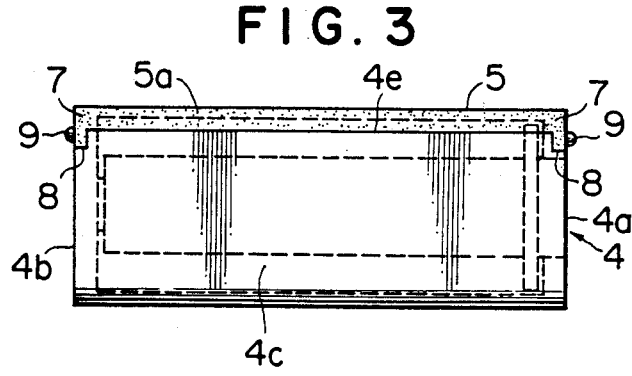
FIG. 3 is an elevational view of the same.
Figure 4:
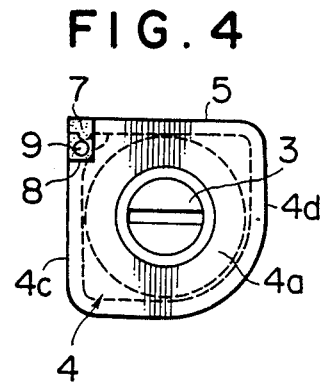
FIG. 4 is a side view of the same.

A preferred embodiment of the invention will now be described with reference to FIG. 1 through FIG. 8. As shown in FIG. 1 through FIG. 8, a photographic film cartridge 1 comprises a cartridge case 2 and a spool 3. The cartridge case 2 comprises a cartridge body 4 having the shape of a box open on one side and a flexible wall portion 5 provided on the open side. The cartridge body 4 extends along a longitudinal axis X and has two pairs of opposing end walls 4a, 4b and 4c, 4d. The spool 3 extends substantially coaxially with respect to the cartridge case 4 and is carried at the opposite end portions by the opposing end walls 4a, 4b of the cartridge body 4 for rotation about a longitudinal axis X. The roll of film 6 is wound onto the spool 3 encased in the cartridge case 2. The flexible wall portion 5 has an axially extending substantially straight edge portion 5a which is engaged with a rigid edge portion 4e of the end wall 4a of the cartridge body 4. The flexible wall portion 5 further has at opposite ends thereof a pair of engaging portions 7 extending substantially vertically with respect to the flexible wall portion 5. The end walls 4a and 4b are provided with a pair of notches 8 fitting with the engaging portions 7. Each engaging portions is provided with a projection 9 thereon.

Figure 6:
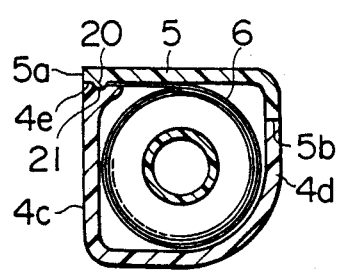
FIG. 6 is a cross-sectional view along line $X_1$—$X_1$ in FIG. 2, with the cartridge is in its closed state.
Figure 8:
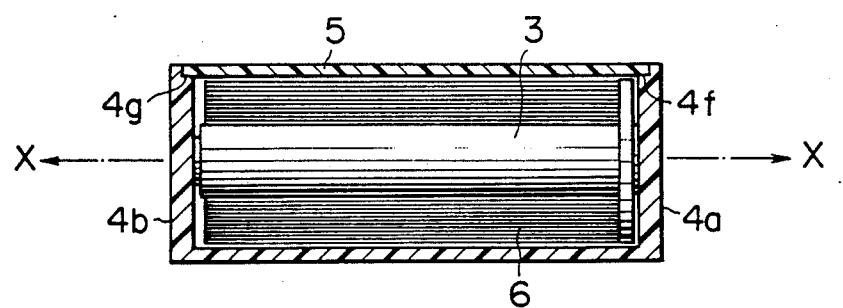
FIG. 8 is a cross-sectional view along line Y—Y in FIG. 2.

As shown in FIG. 6, an edge portion 5b of the flexible wall portion 5 is connected with the wall 4d of the cartridge body 4 so that at least the flexible wall portion 5 and the end walls 4c, 4d are one piece. When the flexible wall portion 5 is in the closed position, the engaging portions 7 of the flexible wall portion 5 are engaged with the notches 8 of the cartridge body 4. Therefore the flexible wall portion 5 is held in close contact with the cartridge body 4 in such a manner that the interior of the cartridge 1 is kept shielded from external light. In addition, as shown in FIG. 8, level-difference portions 4f, 4g are formed on inner surfaces of the end walls 4a, 4b. Therefore, even if external light enters into the cartridge 1 through any clearance between the flexible wall portion 5 and level-difference portions 4f, 4g, this light is reflected by the level-difference 4f, 4g and weakened so that the film 6 in the cartridge 1 is not exposed.

As shown in FIG. 6, a longitudinally extending convex portion 20 is formed on an inner surface of the flexible wall portion 5 just before the edge portion 5a, and a longitudinally extending concave portion 21 is formed on the edge portion 4e of the wall 4c of the cartridge body 4. When the flexible portion 5 is in its closed position, the convex portion 20 is fit into the concave portion 21 so that the interior of the cartridge 1 is kept shielded from external light. The tip end of the film 6 is located just before the convex portion 20 and the concave portion 21 which are just before a film outlet slit as interposed between the edge portion 5a of the flexible wall portion 5 and the edge portion 4e of the wall 4c of the cartridge body 4. The convex portion 20 therefore extends across and blocks the film feeding path when the flexible portion 5 is in its closed position.

Figure 5:
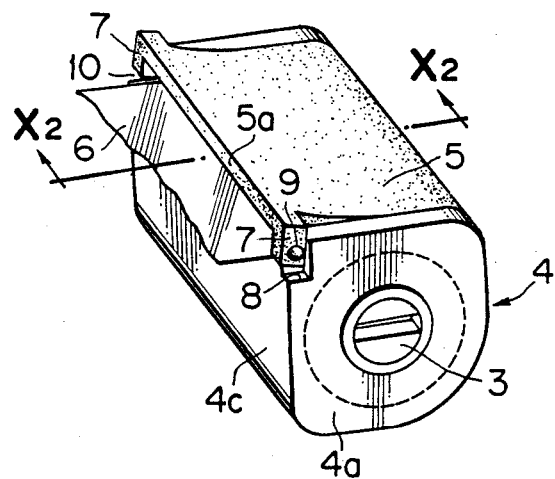
FIG. 5 is a perspective view showing a film outlet formed in the film cartridge shown in FIG. 1.
Figure 7:
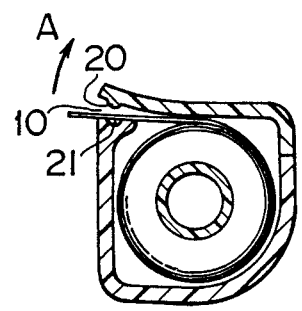
FIG. 7 is a cross-sectional view along line $X_2$—$X_2$ in FIG. 5, with the cartridge is in its open state.

Normally, the flexible wall portion 5 is thus in its closed position, wherein the edge portion 5a of the flexible wall portion 5 is in close contact with the edge portion 4e of the wall 4c of the cartridge body 4 so that the interior of the cartridge 1 can be kept shielded from external light. As the flexible wall portion 5 is made of a flexible material such as metal, plastic or resin, it is possible by pulling the edge portion 5a of the flexible wall portion 5 upward in the direction A shown in FIG. 1 or FIG. 7 and bending the flexible wall portion 5 to move it to its open position. When the flexible wall portion 5 is in its open position, an opening extending along the axis X of the cartridge body 4 is formed between the edge portion 4e of the cartridge body 4 and the edge portion 5a of the flexible wall portion. Therefore, by deflecting the flexible wall portion 5 so that the opening becomes slightly larger than the thickness of the film 6, it is possible, as shown in FIG. 5 or FIG. 7, to form a film outlet 10 for enabling the film 6 to be pulled out from the cartridge 1. The film feeding path is therefore communicated with the outside of the cartridge 1 when the flexible wall portion is opened. The engaging portions 7 have projections 9 thereon. Means in a camera for opening and closing the film outlet 10 (not shown) engages with the projections 9 to lift the edge portion 5a of the flexible wall portion 5 and deflect the flexible wall portion 5, so that the film outlet slit 10 is formed. Instead of the projections 9 there can be provided a pair of recesses.

In the aforementioned embodiment, when the cartridge 1 is not loaded in a camera, i.e. before and after exposure of the film, the entire roll of the film 6 is stored in the cartridge 1 and the edge portion 5a of the flexible wall portion 5 is maintained in close contact with the edge portion 4e of the cartridge body to fully close the film outlet slit 10, whereby the interior of the cartridge 1 can be kept shielded from external light. After the cartridge 1 is loaded in a camera, said means in the camera for opening and closing the film outlet 10 (not shown) engages with the projections 9 formed on the engaging portions 7 to lift the projections 9. Since the flexible wall portion 5 is made of flexible material, the flexible wall portion 5 is deflected about the edge portion 5b thereof as shown in FIG. 5 or FIG. 7 as a result, the film outlet slit 10 for pulling the film 6 out from the cartridge 1 is formed. With the film outlet 10 kept open, the means in the camera for pulling the film out from the cartridge (not shown) pulls out from the cartridge 1 the tip end of the film 6 located just before the film outlet slit 10, and the film 6 is fed to a exposure section in the camera for exposure. The same action is repeated for every exposure of the film. The film 6 is pulled out from the cartridge 1 through the film outlet 10 by the length required to be exposed. After all of the film 6 has been exposed, the spool 3 is rotated by a rotating means of the camera (not shown) to wind the film 6 back onto the spool 3. When a detecting means of the camera (not shown) detects that winding of the film 6 back onto the spool 3 has been completed, said means for opening and closing the film outlet 10 lowers the projections 9 to release the engagement of said means with the projections 9. Therefore, the flexible wall portion 5 returns to its close position from its open position under its elastic force of restoration so that the engaging portions 7 on the opposite ends of the flexible wall portion 5 again engage with the notches 8 and the edge portion 5a of the flexible wall portion 5 is in close contact with the edge portion 4e of the cartridge body 4. Thus, the interior of the cartridge 1 is again shielded from external light. Therefore, the film cartridge 1 can be taken out of the camera without having the film 6 in the cartridge 1 being exposed.

According to the above described embodiment, before and after exposure of the film 6, the engaging portions 7 provided at opposite ends of the flexible wall portion 5 again engaged with the notches 8 and the edge portion 5a of the flexible wall portion 5 is maintained in close contact with the edge portion 4e of the cartridge body 4 so that the interior of the cartridge 1 can be kept shielded from external light. Furthermore, as the film outlet 10 is formed to be a little larger than the thickness of the film, the film 6 can be pulled out from the cartridge 1 through the film outlet 10. Therefore, the light shielding material such as conventionally used felt is not necessary to be provided on the opposing inner surfaces of the film outlet slit. With unnecessary of providing light shielding material, the film can be pulled out from the cartridge without suffering an abrasion and the film cartridge 1 can be produced with higher efficiency than before. Futhermore, in the conventional cartridge a film leader extends to the exterior of the cartridge by a predetermined length and the photographer had to engage the leader with a means in the camera for feeding the film. However, according to the aforesaid embodiment of the present invention, the whole length of the film 6 is normally stored in the cartridge 1 so that the photographer can start taking photographs merely by loading the cartridge in the camera. The film 6 can be loaded in the camera more easily than before without fear of improper loading. In addition, exposure of the film by pulling it out of the cartridge further than necessary can be prevented.

Figure 9:
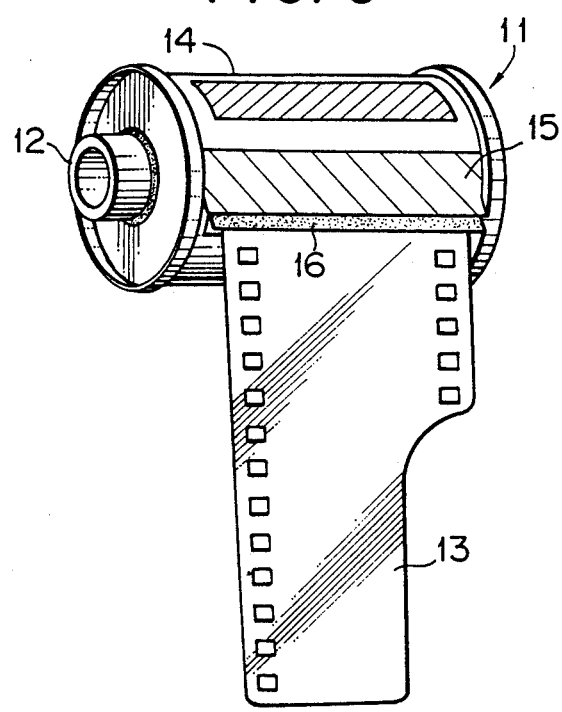
FIG. 9 is a perspective view showing a conventional film cartridge.

Furthermore, in order to determine the size and weight of the film cartridge 1, ten cartridges were test manufactured. All are made of styrol in the shape of the cartridge shown in FIG. 1 through FIG. 8. Twelve-frame film was wound on each spool. The size of the cartridges was 14 mm×35 mm×14 mm, volume was 6.9 cm$^3$ and the average weight was 8.4 g. In contrast to this, the volume of the 12-frame "Fuji Color HR" film cartridge shown in FIG. 9 is 21.6 cm$^3$ and the average weight of the ten such cartridges is 16.2 g.

As described above with respect to the preferred embodiment, according to the present invention, a photographic film cartridge can be obtained which is unnecessary to be provided with light shielding material. The cartridge can also keep the interior of the cartridge shielded from external light before and after photographs are taken. Futhermore, it is possible to prevent abrasion of the film and to produce film cartridges with higher efficiency than before.

In addition, the cartridge can be loaded in a camera more easily without risk of misloading and exposure of the film caused by pulling the leader out more than needed can be prevented. Futhermore, the size and weight of a film cartridge can be reduced to two-thirds or less those of conventional film cartridges. This is because the cartridge in accordance with the present invention consists solely of a spool, a cartridge case, both of which are made of resin, and film wound on the spool, so that no shielding material need be provided in the cartridge. It is very siginificant to decrease the size and weight of the cartridge without decreasing the image area for exposure because this enables a lighter and smaller camera without reducing the image quality of the film. In addition, the resistance upon pulling the film out of the cartridge can be reduced to about 76 g because the film outlet slit opens after the cartridge is loaded in a camera. Abrasion and other troubles can thus be reduced in comparison with other cartridges which have a resistance of 103 g.

The present invention has thus been shown and described with reference to specific embodiment. However, it should be noted that the present invention is in no way limited to the details of the described arrangements but all alternatives, modifications, and equivalents may be included within the spirit and scope of the invention as defined in the attached claims.

For example, in the above described embodiment, a pair of projections 9 are provided on the engaging portions 7 formed on opposite ends of the flexible wall portion 5 and the film outlet 10 is opened when means in a camera for opening and closing a film outlet engages with the projections 9 to lift the edge portion 5a of the flexible wall portion 5 and deflect the flexible wall portion 5. However, the projections 9 can be replaced by a pair of recesses and the film outlet 10 by having the means engaged with the recesses to lift the edge portion 5a of the flexible wall portion 5 and deflect the wall portion 5.

I claim:

1. A photographic film cartridge comprising: a cartridge case having a longitudinal axis and opposing end walls; a spool extending substantially coaxially with respect to said cartridge case, said spool being carried at opposite end portions of the spool by said opposing end walls of said cartridge case for rotation about a longitudinal axis of the spool, said cartridge case including a flexible wall portion having an axially extending substantially straight edge portion, said cartridge case further including a rigid edge portion for cooperation with said straight edge portion, said flexible wall portion being deflectable between a closed position wherein said straight edge portion is engaged with said rigid edge portion to provide a substantially light-tight seal and an open position wherein said straight edge portion is spaced apart from said rigid edge portion to provide an axially extending film outlet slit opening between said edge portions.

2. A photographic film cartridge in accordance with claim 1, wherein said film cartridge is provided with means for enclosing a tip end of said film between said straight edge portion and said rigid edge portion when said flexible wall portion is in said closed position.

3. A photographic film cartridge in accordance with claim 1, wherein said film cartridge is provided with means for locking said flexible wall portion to said cartridge case when said flexible wall portion is in said closed position.

4. A photographic film cartridge comprising: a cartridge case having a longitudinal axis and opposing end walls; a spool extending substantially coaxially with respect to said cartridge case, said spool being carried at opposite end portions of the spool by said opposing end walls of said cartridge case for rotation about a longitudinal axis of the spool, said cartridge case having means for providing a longitudinally extending film outlet slit opening, said means being controllably movable between a closed position wherein said film outlet slit opening is closed to extend across and block a film-feeding path on which the film is fed and an open position wherein said film outlet slit opening is opened to communicate said film-feeding path with the outside of said cartridge case.

5. A photographic film cartridge as claimed in claim 4, wherein said film cartridge is provided with means for locking said movable means to said cartridge case when said movable means is located in said closed position.

6. A photographic film cartridge as claimed in claim 4, wherein said film cartridge is provided with means for fixing a tip end of said film in close proximity to said film outlet slit opening in said cartridge case.

7. A photographic film cartridge comprising: a cartridge case having a longitudinal axis and opposing end walls; a spool extending substantially coaxially with respect to said cartridge case, said spool being carried at opposite end portions of the spool by said opposing end walls of said cartridge case for rotation about a longitudinal axis of the spool, said cartridge case including a flexible wall portion having an axially extending substantially straight edge portion, said cartridge case further including a rigid edge portion for cooperation with said straight edge portion, said flexible wall portion being deflectable about a line in the flexible wall which is parallel to said rigid edge between a closed position wherein said straight edge portion is engaged with said rigid edge portion to provide a substantially light-tight seal and an open position wherein said straight edge portion is spaced apart from said rigid edge portion to provide an axially extending film outlet slit opening between said edge portions.

8. A photographic film cartridge, comprising:
a cartridge case having a longitudinal axis and opposing end walls; and
a spool carried between said end walls for rotation within said cartridge case;
wherein said cartridge case includes a flexible wall portion having an axially extending first edge portion, and a second edge portion for cooperation with said first edge portion, said flexible wall portion being deflectable between a closed position wherein said first edge portion is engaged with said second edge portion to provide a substantially light-tight seal and an open position where said first edge portion is spaced from said second edge portion to form a axially extending film outlet slit opening;
at least said flexible wall portion and said second edge portion being one piece.

9. A photographic film cartridge in accordance with claim 8, wherein said film cartridge is provided with means for enclosing a tip end of a film between said first edge portion and said second edge portion when said flexible wall portion is in said closed position.

10. A photographic film cartridge in accordance with claim 8, wherein said film cartridge is provided with means for locking said flexible wall portion to said cartridge case when said flexible wall portion is in said closed position.

* * * * *